US008626647B1

(12) United States Patent
Trimble, Jr. et al.

(10) Patent No.: US 8,626,647 B1
(45) Date of Patent: Jan. 7, 2014

(54) ELECTRONIC MORTGAGE DOCUMENT CERTIFICATION

(71) Applicant: Fannie Mae, Washington, DC (US)

(72) Inventors: J. Harvey Trimble, Jr., Great Falls, VA (US); Cynthia H. Keith, Great Falls, VA (US); Charlotte Haberaecker, Annandale, VA (US); N. Grande Bucca, Tenafly, NJ (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 13/647,907

(22) Filed: Oct. 9, 2012

Related U.S. Application Data

(62) Division of application No. 10/326,867, filed on Dec. 20, 2002, now Pat. No. 8,301,553.

(60) Provisional application No. 60/369,030, filed on Apr. 1, 2002.

(51) Int. Cl.
*G06Q 40/00* (2012.01)

(52) U.S. Cl.
USPC ........ 705/38; 705/4; 705/40; 705/54; 705/64; 705/67; 705/76; 427/387; 713/156; 713/167; 713/176; 713/178; 713/179; 713/191; 713/193

(58) Field of Classification Search
USPC .......... 705/4, 38, 40, 54, 64, 67, 76; 713/156, 713/167, 176, 178, 179, 191, 193; 427/387
See application file for complete search history.

(56) References Cited

U.S. PATENT DOCUMENTS 5,615,268 A * 3/1997 Bisbee et al. ................ 713/176
5,671,282 A * 9/1997 Wolff et al. .................. 713/179
5,673,320 A * 9/1997 Ray et al. ...................... 713/176
5,677,955 A * 10/1997 Doggett et al. ................ 705/76

(Continued)

FOREIGN PATENT DOCUMENTS

JP 2003256744 A 9/2003
WO WO-0008541 A1 2/2000

(Continued)

OTHER PUBLICATIONS

"Smart Document Specification—RC6.6," Mortgage Bankers Association of America, Inc., Sep. 19, 2002, pp. 1-87.

(Continued)

*Primary Examiner* — James Trammell
*Assistant Examiner* — Sanjeev Malhotra
(74) *Attorney, Agent, or Firm* — Rader, Fishman & Grauer PLLC

(57) ABSTRACT

Electronic documents corresponding to executed paper documents are certified. A certifying agent receives an electronic document and a corresponding paper document that had been executed pursuant to some transaction. The certifying agent compares the information contained in the paper to that in the electronic mortgage document. If the paper adequately corresponds to the electronic document and is otherwise sufficient, then the certifying agent certifies the electronic document so that other parties can reliably engage in transactions involving the electronic document without having to possess or otherwise inspect the executed paper document. Certification involves application of some form of indicia of certification to the electronic document, such as updating the value of a field corresponding to certification in the electronic document and/or applying a digital or electronic signature corresponding to the certifying agent to the electronic document.

29 Claims, 14 Drawing Sheets

(56) References Cited

U.S. PATENT DOCUMENTS

| | | | | |
|---|---|---|---|---|
| 5,748,738 | A * | 5/1998 | Bisbee et al. | 713/176 |
| 5,781,914 | A | 7/1998 | Stork et al. | |
| 6,021,202 | A * | 2/2000 | Anderson et al. | 705/54 |
| 6,029,149 | A * | 2/2000 | Dykstra et al. | 705/38 |
| 6,189,009 | B1 | 2/2001 | Stratigos et al. | |
| 6,209,095 | B1 * | 3/2001 | Anderson et al. | 713/176 |
| 6,237,096 | B1 * | 5/2001 | Bisbee et al. | 713/178 |
| 6,258,412 | B1 * | 7/2001 | Ewing | 427/387 |
| 6,289,460 | B1 | 9/2001 | Hajmiragha | |
| 6,367,013 | B1 | 4/2002 | Bisbee et al. | |
| 6,438,526 | B1 | 8/2002 | Dykes et al. | |
| 6,452,614 | B1 | 9/2002 | King et al. | |
| 6,456,981 | B1 | 9/2002 | Dejaeger et al. | |
| 6,594,633 | B1 | 7/2003 | Broerman | |
| 6,609,200 | B2 * | 8/2003 | Anderson et al. | 713/176 |
| 6,635,089 | B1 | 10/2003 | Burkett et al. | |
| 6,711,554 | B1 * | 3/2004 | Salzmann et al. | 705/64 |
| 6,751,632 | B1 | 6/2004 | Petrogiannis | |
| 6,779,024 | B2 * | 8/2004 | DeLaHuerga | 709/217 |
| 6,868,402 | B1 * | 3/2005 | Hirota et al. | 705/40 |
| 6,904,412 | B1 * | 6/2005 | Broadbent et al. | 705/38 |
| 7,085,735 | B1 * | 8/2006 | Hall et al. | 705/4 |
| 7,216,083 | B2 | 5/2007 | Parmelee et al. | |
| 7,237,114 | B1 * | 6/2007 | Rosenberg | 713/176 |
| 7,263,618 | B2 * | 8/2007 | Cofta et al. | 713/193 |
| 2001/0002485 | A1 * | 5/2001 | Bisbee et al. | 713/167 |
| 2001/0005829 | A1 | 6/2001 | Raveis | |
| 2001/0018739 | A1 * | 8/2001 | Anderson et al. | 713/176 |
| 2001/0029482 | A1 * | 10/2001 | Tealdi et al. | 705/38 |
| 2001/0044764 | A1 | 11/2001 | Arnold | |
| 2001/0047326 | A1 * | 11/2001 | Broadbent et al. | 705/38 |
| 2002/0010679 | A1 | 1/2002 | Felsher | |
| 2002/0019838 | A1 | 2/2002 | Petrogiannis | |
| 2002/0029194 | A1 | 3/2002 | Lewis et al. | |
| 2002/0035578 | A1 | 3/2002 | Stratigos et al. | |
| 2002/0049624 | A1 | 4/2002 | Raveis | |
| 2002/0052814 | A1 | 5/2002 | Ketterer | |
| 2002/0059137 | A1 | 5/2002 | Freeman et al. | |
| 2002/0069179 | A1 * | 6/2002 | Slater et al. | 705/67 |
| 2002/0069358 | A1 | 6/2002 | Silvester | |
| 2002/0073020 | A1 | 6/2002 | McFarland et al. | |
| 2002/0078159 | A1 | 6/2002 | Petrogiannis et al. | |
| 2002/0091651 | A1 | 7/2002 | Petrogiannis et al. | |
| 2002/0107790 | A1 * | 8/2002 | Nielson | 705/38 |
| 2002/0116321 | A1 | 8/2002 | Arehart | |
| 2002/0116331 | A1 | 8/2002 | Cataline et al. | |
| 2002/0116531 | A1 | 8/2002 | Chu | |
| 2002/0128969 | A1 | 9/2002 | Parmelee et al. | |
| 2002/0129256 | A1 | 9/2002 | Parmelee et al. | |
| 2002/0129257 | A1 | 9/2002 | Parmelee et al. | |
| 2002/0143711 | A1 | 10/2002 | Nassiri | |
| 2002/0169702 | A1 | 11/2002 | Eaton et al. | |
| 2002/0178035 | A1 | 11/2002 | Lajouanie | |
| 2003/0009418 | A1 | 1/2003 | Green et al. | |
| 2003/0018558 | A1 | 1/2003 | Heffner et al. | |
| 2003/0036994 | A1 * | 2/2003 | Witzig et al. | 705/38 |
| 2003/0055783 | A1 | 3/2003 | Cataline et al. | |
| 2003/0074297 | A1 | 4/2003 | Carragher | |
| 2003/0084311 | A1 * | 5/2003 | Merrien et al. | 713/191 |
| 2003/0110400 | A1 | 6/2003 | Cartmell et al. | |
| 2003/0120588 | A1 | 6/2003 | Dodd et al. | |
| 2003/0144948 | A1 | 7/2003 | Cleary et al. | |
| 2003/0158811 | A1 | 8/2003 | Sanders et al. | |
| 2003/0172296 | A1 | 9/2003 | Gunter | |
| 2003/0172297 | A1 | 9/2003 | Gunter | |
| 2003/0172298 | A1 | 9/2003 | Gunter et al. | |
| 2003/0172299 | A1 | 9/2003 | Gunter | |
| 2003/0177071 | A1 | 9/2003 | Treese et al. | |
| 2003/0182151 | A1 | 9/2003 | Taslitz | |
| 2003/0208557 | A1 | 11/2003 | Higbee et al. | |
| 2003/0225688 | A1 | 12/2003 | Dobbins | |
| 2003/0233418 | A1 | 12/2003 | Goldman | |
| 2004/0093493 | A1 * | 5/2004 | Bisbee et al. | 713/156 |
| 2004/0111619 | A1 | 6/2004 | Laurie et al. | |
| 2005/0160272 | A1 * | 7/2005 | Teppler | 713/178 |

FOREIGN PATENT DOCUMENTS

| | | | |
|---|---|---|---|
| WO | WO-0019296 | A1 | 4/2000 |
| WO | WO-0019315 | A1 | 4/2000 |
| WO | WO-0049521 | A1 | 8/2000 |
| WO | WO-0062140 | A2 | 10/2000 |
| WO | WO-0127832 | A1 | 4/2001 |
| WO | WO-0201479 | A1 | 1/2002 |
| WO | WO-0203174 | A2 | 1/2002 |
| WO | WO-0203774 | A2 | 1/2002 |
| WO | WO-0221383 | A1 | 3/2002 |
| WO | WO-0237367 | A1 | 5/2002 |
| WO | WO-0237386 | A1 | 5/2002 |
| WO | WO-02063431 | A2 | 8/2002 |
| WO | WO-02075575 | A1 | 9/2002 |
| WO | WO-02075615 | A1 | 9/2002 |
| WO | WO-02075616 | A1 | 9/2002 |
| WO | WO-02075617 | A1 | 9/2002 |
| WO | WO-02075618 | A1 | 9/2002 |
| WO | WO-03077130 | A1 | 9/2003 |

OTHER PUBLICATIONS

"Guidelines for Document Custodians," Fannie Mae, Sep. 9, 1999.

Article titled: "eOriginal Inc. Announces First Totally Electronic Consumer Mortgage Closings; Time to Close, Record and Deliver Mortgage Reduced from 45 days to 5 Hours," Business Wire, Oct. 7, 1999, 3 pages.

Form titled: "Mortgage of a Ship to secure Account Current etc/ other obligation" per the 'Merchant Shipping Act 1995,' 6 pages.

Memorandum M-00-15 issued by Executive Office of the President, Office of Management and Budget, Washington, DC 20503 dated Sep. 25, 2000 and titled: "OMB Guidance on Implementing the Electronic Signatures in Global and National Commerce Act," 18 pages.

* cited by examiner

```
<?xml version="1.0" encoding="UTF-8"?>
<!DOCTYPE ELECTRONICDOC SYSTEM "smartdoc_V1.dtd">
<ELECTRONICDOC DocId="MD01">
        <HEADER>
                <NAME Type="Note" State="Populated" Negotiable="True" MustBeRecorded="False"/>
                <AUDIT_TRAIL>
                        <ENTRY Logger="Joe Smith" Action="Template" DateTime="2000-12-08 14:54:00"/>
620                     <ENTRY Logger="Doc Prep" Action="Populated" DateTime="2001-05-09T09:30:01"/>
                </AUDIT_TRAIL>
                <SIG_MODEL>
                        {optional}
                </SIG_MODEL>
        </HEADER>
        <DATA Id="Data01">
                <MAIN>
                        <LOAN><MORTGAGE_TERMS InterestRatePercent="6"/></LOAN>
        660             ...
                        <BORROWER _FirstName="Rebecca" _MiddleName="Kate" _LastName="Thornton"/>
                </MAIN>
630             <MAP Target="View01">
                        <ARC DataEnd="//MORTGAGE_TERMS/@InterestRatePercent" ViewEnd="id(InterestRate)"/>
                        ...
        670             <ARC DataEnd="//BORROWER/@_FirstName" ViewEnd="id(BorrowerNameFirst)"/>
                        <ARC DataEnd="//BORROWER/@_MiddleName" ViewEnd="id(BorrowerNameMiddle)"/>
                        <ARC DataEnd="//BORROWER/@_LastName" ViewEnd="id(BorrowerNameLast)"/>
                </MAP>
        </DATA>
```

640 {
```
<VIEW Id="View01" MimeType="text/html" Tagged="True">
    <html>
        <head>
            <title> NOTE </title>
        </head>
        <body>
            ...
            I will pay interest at a yearly rate of <span class="underlinedata"
            id="InterestRate">6</span>%. <br/>
            ...
            <span id="BorrowerNameFirst">Rebecca</span>
            <span id="BorrowerNameMiddle">Kate</span>
            <span id="BorrowerNameLast">Thornton</span>
            ...
        </body>
    </html>
</VIEW>
```
650 {
```
<SIGNATURES>
    {Optional}
</SIGNATURES>
</ELECTRONICDOC>
```

*FIG. 6B*  600

```xml
<?xml version="1.0" encoding="UTF-8"?>
<!DOCTYPE ELECTRONICDOC SYSTEM "smartdoc_V1.dtd">
<ELECTRONICDOC DocId="MD01">
    <HEADER>
        <NAME Type="Note" State="Certified" ..."/>
        <AUDIT_TRAIL>
            <ENTRY Logger="Joe Smith" Action="Template" DateTime="2000-12-08 14:54:00"/>
            <ENTRY Logger="Doc Prep" Action="Populated" DateTime="2001-05-09T09:30:01"/>
            <ENTRY Logger="John Hancock" Action="Certification" DateTime="2001-11-16 16:05:00"/>
        </AUDIT_TRAIL>
        <SIG_MODEL>
            <SIGNER Areas="CertifierAreas01" Role="Certifying Agent"
                    Targets="Certifier01" Area="CertifierArea01" Signature="Certifier01Sig"/>
            <SIGNER Role="TamperSeal" Type="Dsig"
                    Signature="TamperSeal01"/>
        </SIG_MODEL>
    </HEADER>
    <DATA Id="Data01">
        <MAIN>
            <LOAN><MORTGAGE_TERMS InterestRatePercent="6"/></LOAN>
            ...
            <BORROWER _FirstName="Rebecca" _MiddleName="Kate" _LastName="Thornton"/>
        </MAIN>
        <MAP Target="View01">
            <ARC DataEnd="//MORTGAGE_TERMS/@InterestRatePercent" ViewEnd="id(InterestRate)"/>
            ...
            <ARC DataEnd="//BORROWER/@_FirstName" ViewEnd="id(BorrowerNameFirst)"/>
            <ARC DataEnd="//BORROWER/@_MiddleName" ViewEnd="id(BorrowerNameMiddle)"/>
            <ARC DataEnd="//BORROWER/@_LastName" ViewEnd="id(BorrowerNameLast)"/>
            ...
        </MAP>
    </DATA>
    <DATA Id="Data02">
        <MAIN>
            <CERTIFYINGAGENT_RepName="John Hancock"/>
            <CERTIFYINGAGENT_CompName="Certification Inc."/>
        </MAIN>
        <MAP Target="View02">
            <ARC DataEnd="//CERTIFYINGAGENT/@_RepName" ViewEnd="id(CertifierName)"/>
            <ARC DataEnd="//CERTIFYINGAGENT/@_CompName" ViewEnd="id(CertifierComp)"/>
        </MAP>
    </DATA>
```

*FIG. 8A*

```
      <VIEW Id="View01" MimeType="text/html" Tagged="True">
      ...
      </VIEW>
      <VIEW Id="View02" Tagged="True">
                <SIG_TARGET Id="Certifier01">
                <html>
                  <head>
                          <title>CERTIFICATION of EXECUTED PAPER</title>
                  </head>
                  <body> This electronic mortgage document has been compared to a corresponding executed paper
                          mortgage document. The relevant data in the electronic and paper mortgage documents
                          match, and other parties can reliably transact on the electronic mortgage document
                          without further inspection of the paper mortgage document. </body>
840                   <SIG_AREA Id="CertifierArea01">
                        <SIG_ABOVE> Certifying Agent </SIG_ABOVE>
                          <br/>
                            <SIG_TEXT Id="Certifier01Sig">
                                eSigned by John Hancock @ Certification Inc. on 11/16/2001at 16:05</SIG_TEXT>
                              <SIG_BELOW>
                                <span id="CertifierName">John Hancock</span>
                                <span id="CertifierComp">Certification Inc.</span>
                              </SIG_BELOW>
                          <br/>
                        </SIG_AREA>
                </html>
                </SIG_TARGET>
      </VIEW>
      <SIGNATURES>
                <Signature ID="TamperSeal01">
850             {Signature Information for Certifying Agent}
                </Signature>
      </SIGNATURES>
  </ELECTRONICDOC>
```

ELECTRONIC MORTGAGE DOCUMENT CERTIFICATION

CROSS REFERENCE TO RELATED APPLICATIONS

The present application is a Divisional Application of the patent application Ser. No. 10/326,867, filed Dec. 20, 2002, which is based on U.S. Provisional Application No. 60/369, 030, filed Apr. 1, 2002, the entire contents of which are incorporated herein by reference.

BACKGROUND OF THE INVENTION

1. Field of the Invention

This invention relates generally to financial transactions, more particularly to certifying transactions, and still more particularly to certifying electronic mortgage documents against corresponding paper documents.

2. Description of the Related Art

Borrowers often use lenders to finance real estate transactions in the primary mortgage market. A mortgage loan closing may involve a property sale, or a refinancing of an owned property. Where there is a property sale, a typical mortgage loan closing can involve a buyer, seller, and lender. The lender loans funds to the buyer, and disburses them to the seller to complete the transaction. The buyer signs a promissory note (also referred to as a mortgage note) that obligates the buyer to repay the loaned funds. The buyer is thus often referred to as the borrower in the mortgage loan closing transaction.

Lenders sell mortgages to investors in what is known as the secondary mortgage market. Examples of investors include government sponsored entities (GSEs) such as Fannie Mae, Freddie Mac, and Ginnie Mae. Investors also include commercial banks, community banks, savings and loan associations, and others. Some of these entities participate as both lenders and investors at various times. That is, they both sell and purchase portfolios of mortgages. Similar mortgages are also often pooled together and used to as security for investment instruments referred to as form mortgage-backed securities.

A problem with the sale of loans in a secondary market is the lag time between the original acquisition of the mortgage by the lender (e.g., at the closing) and the sale of the mortgage to the investor.

Electronic documents are being introduced for mortgage transactions. Use of these documents can be beneficial to participants in such markets because they can reduce the amount of physical error checking that is often required for paper documents, as well as the number of opportunities for creating discrepancies and errors among and between the various forms used by different participants. However, even where a lender uses electronic documents, a typical closing will still often implement traditional paper based practices, wherein borrowers sign standard paper forms using pen and ink (also referred to as "wet" signing in the industry). Where such a mortgage is later sold to a secondary market investor, since traditional paper forms are used, traditional delays in providing funds to lenders pursuant to the mortgage purchase by the investor have remained.

What is needed is expedited sale of mortgage loans on the secondary mortgage market following closing of such mortgage loans.

SUMMARY OF THE INVENTION

The present invention improves on the time needed for sales of mortgage loans, typically in the secondary mortgage market. Lender purchase and funding according to embodiments of the present invention minimizes the above described lag time, and thus tends to lower the costs of participating in the secondary market.

In one aspect, an embodiment of the present invention expedites the sale of mortgage loans to investors, and the provision of purchase proceeds to a lender. Prior to a closing, a lender creates a closing package containing paper documents or electronic data used to create a paper closing package. A typical package includes a promissory note, which is also referred to as a note. Although equally applicable to other types of mortgage documents, in one embodiment the present invention is particularly applicable to the certification of promissory notes.

In practice, a lender provides the closing package to a closing agent, who is responsible for obtaining the necessary signatures on the promissory note, among other things. Following a conventional execution of the necessary documents in the closing package, including the note, the closing agent forwards the executed closing package to a certifying agent. Certification that an electronic mortgage document adequately corresponds to the executed paper for the purposes of supporting subsequent transactions is then provided. In one embodiment, certification of the electronic mortgage document against the executed paper includes a determination that, for a specified data set having a number of fields, the values in the two match. Examples of fields in the data set are the note date, lender name, lender identification number, borrower name(s), property address, payment address, loan amount, type of loan, term, and interest rate.

In addition to representing that the electronic mortgage document includes the necessary fields and has the correct corresponding values, certification may comprise other representations. These include representations that the note was properly executed pursuant to the closing, that the note was signed as drawn, and that funds were disbursed from the lender to an appropriate recipient (e.g., the borrower).

There will be various environments wherein parties can reliably engage in transactions using the electronic mortgage document based upon its having been certified. For example, in support of the expedited sale of mortgage loans in a secondary market, an investor can rely on certification to immediately provide funds to a lender selling the mortgage, in lieu of providing such funds after traditional delays involved in selling mortgages in the secondary market.

Preferably, a certifying agent receives an electronic document and a corresponding paper document that had been executed pursuant to some transaction. The certifying agent compares the information contained in the paper to that in the electronic mortgage document. If the paper adequately corresponds to the electronic document and is otherwise sufficient, then the certifying agent certifies the electronic document so that other parties can reliably engage in transactions involving the electronic document without having to possess or otherwise inspect the executed paper document. Certification can involve application of some form of indicia of certification to the electronic document, such as updating the value of a field corresponding to certification in the electronic document and/or applying a digital or electronic signature corresponding to the certifying agent to the electronic document.

Certain embodiments of the present invention are applicable to transactions other than mortgage transactions. Additionally, embodiments of the present invention are not necessarily limited to funding lenders pursuant to purchases of original mortgages by an investor in the secondary market.

They also apply to closings pursuant to mortgage refinancing, purchases of mortgages by a warehouse lender, etc.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIGS. 6A-B illustrate an example of a format for an electronic document.

FIGS. 8A-B illustrate an example of a format for an electronic document including indicia of certification in accordance with the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
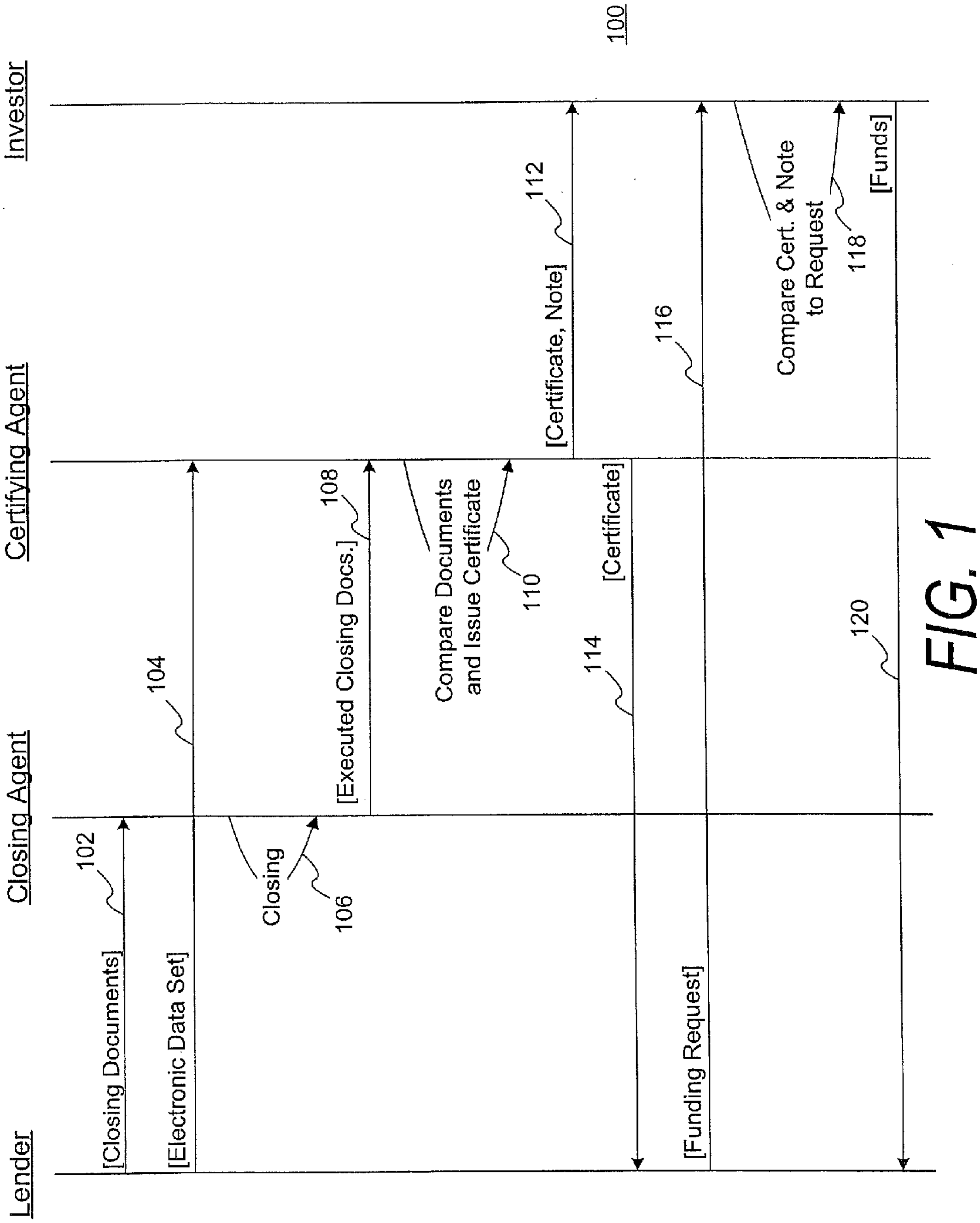
FIG. 1 is an event diagram illustrating an embodiment of closing assurance for expedited sale of mortgage loans in accordance with the present invention.

FIG. 1 is an event diagram illustrating an embodiment of closing assurance based certification for expedited sale of mortgage loans. The participants in the process include a lender, closing agent, certifying agent, and secondary investor. The expedited sale process 100 of FIG. 1 avoids traditional delays in providing funds to lenders pursuant to the purchase of a mortgage, notwithstanding the execution of paper documents at the closing. Preferably, the process 100 is used in conjunction with a system that implements an electronic data set associated to the paper closing documents. The electronic data set comprises fields and associated values for the particular mortgage transaction. The fields in the data set are typically dictated by a seller of the mortgage, such as an investor in the secondary mortgage market. Examples of fields in the data set are the note date, lender name, lender identification number, borrower name(s), property address, payment address, loan amount, type of loan, term, interest rate, and investor identification number. A preferred set of fields is provided below, although embodiments of the present invention will implement data sets having fewer, greater or wholly different fields. The electronic data set is sent to the certifying agent in conjunction with paper closing documents, and the certifying agents makes various determinations and ultimately issues a certificate having certain representations. The investor, upon receipt of a request for funding from the lender and such a certificate, provides funds to the lender.

Referring to the process 100 of FIG. 1, initially closing documents are sent 102 to the closing agent for completion of the closing. Preferably, the closing documents include a mortgage note, which may also be referred to as a note. The closing documents will be typically sent as a closing package including the note, a security instrument, RESPA required documents, and others. The closing documents can be sent using traditional paper document carriers, or may be electronically sent to the closing agent, who then prints the documents and assembles the closing package. There are numerous alternatives, including couriers, facsimile, and others. Additionally, although the lender is shown to provide the documents to the closing agent, the closing agent may actually access and request the closing documents from a third party. For example, a service provider may provide a system that allows the lender to originate and create loan documents, and provide a facility that allows specific documents to be accessed or forwarded to the closing agent, certifying agent, and others.

Various systems are known for allowing lenders to generate mortgage documents. For example, the lender may originate a mortgage and create the necessary documents in conjunction with a service provider's electronic mortgage system, such as the MORNETPlus® 2000 system, which implements Desktop Underwriter®, Desktop Originator®, and MORNETPlus Connections, all provided by Fannie Mae. In particular, the Desktop Underwriter® works with various conventional Loan Originating Systems (LOS) to allow lenders to originate mortgages and create documents such as loan applications. Other pertinent documents can also be created by independently using an LOS, or through MORNETPlus Connections. There are various alternatives, including but not limited to those working with the Freddie Mac Loan Prospector®, and others.

The closing agent thus obtains paper closing documents by receiving them in paper form from the lender, by printing them based on an electronic document, by generating them based upon a comprehensive electronic data set, or through other means. The closing agent then conducts a conventional closing 106, wherein the documents are reviewed and executed by relevant parties, such as the borrowers. The executed documents include, among others, the mortgage note. The executed closing documents are then sent 108 to the certifying agent, again using conventional means for sending paper documents. Preferably, the executed closing documents include the original mortgage note executed by the parties at the closing, although certification may involve additional or alternative documents as well.

An electronic data set is also sent 104 to the certifying agent. Although the electronic data set is shown to have been sent 104 prior to the closing, it may also be sent to the certifying agent in conjunction with sending 108 the executed closing documents to the certifying agent, or may be sent after receipt of the closing documents. The electronic data set can be variously established. For example, it may be based upon information contained in the lender database corresponding to the mortgage. The lender is previously apprised of the fields in the data set by the investor, and sends the fields and corresponding values for the particular mortgage to the certifying agent. In another example, the lender uses a formal electronic document in creating the closing package, even though the closing will implement paper. The electronic document can be sent to the certifying agent and other parties to transactions related to the mortgage. The electronic document will typically include a data section that contains numerous fields and corresponding values for at least one closing document (e.g., the note). There, a separate electronic data set need not be sent to the certifying agent. Rather, the electronic data set is found within the data section of the electronic document. The certifying agent is informed as to the constituent fields of the data set, and accesses the data section to find the fields and corresponding values in the electronic document. Preferably, the electronic data set is sent to the certifying agent using conventional electronic mail, although various techniques including but not limited to postal service, facsimile, electronic data transfer may be used. The certifying agent may be a traditional title company, although there are various alternatives. Examples of certifying agents are the Stewart Information Services Corp., Fidelity National Title Insurance Company, and others.

Following the closing 106, the certifying agent compares the executed closing documents to the electronic data set, and issues a certificate based upon that comparison, as indicated by event 110. This certificate contains a number of representations and warranties regarding a review of the closing documents. These preferably include representations that the executed note has the fields and associated values found in the data set, that the note was properly executed pursuant to the closing, that the note was signed as drawn, and that funds were disbursed from the lender to an appropriate recipient (e.g., the borrower). In one embodiment, the certificate is issued pursuant to a contractual relationship involving the lender, certifying agent, and the investor. In exchange for some form of consideration from the lender, the certifying agent issues the certificate and is primarily liable for failure of any of the associated representations. The investor can seek relief for damages resulting from failed representations as a party to the contract. Alternatively, the investor can be a third party beneficiary to a contract between the lender and the certifying agent. In another alternative, the certificate evidences a surety policy that is obtained by the lender, to which the investor and lender are beneficiaries.

Although a note is described in connection with certain embodiments, the present invention is equally applicable to other mortgage documents. The relevant mortgage document will be any document required by the entity providing the funds.

A copy of the certificate is sent 112, 114 to the lender and an investor, typically along with the note and any remaining delivery documents. The certificate is preferably sent as an Adobe Acrobat® PDF file attached to an e-mail that is sent to those parties, although other delivery mechanisms, such as facsimile, postal, etc. may also be used. A verified copy of the closing documents is also preferably sent 112 to the investor in conjunction with the certificate. This may also be sent as a PDF file attached to an e-mail. Of course, other formats such as TIF, GIF, or others may also be used.

Pursuant to receipt 116 of a funding request from the lender, the investor compares 118 the certificate and the note to the funding request information, and sends 120 funds to the lender where a match is found. In one embodiment, the funding request is verifiably associated with the certificate and note through a cross comparison of key pertinent data, such as the loan amount, the interest rate, and the property address. As between the investor and the certifying agent, a unique number may also be used to associate a received certificate with a previously identified mortgage. This number may also be used in conjunction with a previous indication that the lender would like to invoke the described closing assurance based expedited funding. An attribute may also be associated with the funding request to indicate to the investor that expedited funding based upon receipt of the certificate will be implemented. This may be in the form of a code, or value in a field associated with the request.

It should be recognized that there will be various alternatives to the described process, once the artisan is instructed according to the described embodiments. For example, although the closing agent and the certifying agent are shown separately, it is noted that the functions of the two entities can merge, such that one entity will perform the functions shown for both the closing agent and the certifying agent.

As described, the electronic data set preferably comprises fields and the associated values for a particular mortgage transaction. Examples of fields in the data set include the note date, lender name, lender identification number, borrower name(s), property address, payment address, loan amount, type of loan, term, interest rate, and investor identification number. Table I lists a preferred set of fields that dictate the content of an electronic data set. Some fields will have null values depending upon circumstances. For example, a fixed rate mortgage will not have particular values for fields solely applicable to adjustable rate mortgages. These fields are provided by way of example, as the requirements and contents of the data set may vary depending upon factors such as industry standards, customary usage, agreements between certifying agents, investors, and possibly lenders, type of document being certified, and the like. Thus, an electronic data set may include more, less, or different fields than those described. Tables I and II below represent two alternatives for the data set.

TABLE I

Data Set Fields (Alternative A):

| No. | Fields |
|---|---|
| 1. | Note Date |
| 2. | Mortgage Identification Number |
| 3. | Lender Loan ID |
| 4. | Lender Name |
| 5. | Place of Payment |
| 6. | Loan Type |
| 7. | Borrower's Name |
| 8. | Property Address |
| 9. | City |
| 10. | State |
| 11. | Zip Code |
| 12. | Original Loan Amount |
| 13. | Current Note Rate |
| 14. | 1st Payment Due Date |
| 15. | Original Term |
| 16. | Constant P&I Payment |
| 17. | Amortization Type |
| 18. | Amortization Term |
| 19. | Grace Period |
| 20. | Late Charge for Overdue Payment % |
| 21. | Balloon Call Date |
| 22. | Plan Number |
| 23. | Mortgage Margin |

TABLE I-continued

| Data Set Fields (Alternative A): | |
|---|---|
| No. | Fields |
| 24. | 1st Rate Change Date |
| 25. | First Pmt Chg Date |
| 26. | Maximum Mortgage Rate |
| 27. | Minimum Mortgage Rate |
| 28. | Maturity Date |
| 29. | Closing Agent Name |
| 30. | Closing Agent Phone Number |
| 31. | Closing Agent Fax Number |
| 32. | Closing Agent Email Address |
| | Multistate Adjustable Rate Note-ARM |
| 33. | ARM Plan Number |
| 34. | Interest rate caps per adjustment |
| 35. | Frequency of change in interest rate and payment |
| 36. | 1st Day of interest rate Change |
| 37. | Calculation of Interest Rate Change-Number of percentage points to add |
| 38. | Calculation of Interest Rate Change-Percentage to the Current Index |
| | Multistate Convertible Adjustable Rate Note-WSJ 1 YR LIBOR |
| 39. | Conversion Option |
| 40. | Conversion Fee |
| | InterestFirst Fixed Rate Note |
| 41. | Initial Monthly Payment (P&I) |
| 42. | Term of initial payments |

TABLE II

| Data Set Fields (Alternative B): | |
|---|---|
| 1. | Closing Date |
| 2. | Lender Loan Number |
| 3. | Lender Name |
| 4. | Loan Type |
| 5. | Borrower's Name |
| 6. | Property Address |
| 7. | City |
| 8. | State |
| 9. | Zip Code |
| 10. | Original Loan Amount |
| 11. | Current Note Rate |
| 12. | 1st Payment Due Date |
| 13. | Original Term |
| 14. | Constant P&I Payment |
| 15. | Amortization Type |
| 16. | Amortization Term |
| 17. | Balloon Call Date |
| 18. | Plan Number |
| 19. | Mortgage Margin |
| 20. | 1st Rate Change Date |
| 21. | First Pmt Chg Date |
| 22. | Maximum Mortgage Rate |
| 23. | Minimum Mortgage Rate |
| 24. | Maturity Date |
| 25. | Maximum Term |
| 26. | Closing Agent Name |
| 27. | Closing Agent Phone Number |

The electronic data set may also be found within a more structured electronic document, such as an electronic mortgage document where mortgages are involved. As with the data set, formal industry standards, customary usage, or the like may dictate the format and content of the electronic mortgage document. For example, the Mortgage Industry Standards Maintenance Organization (MISMO) originates electronic document specifications to be used for mortgage transactions (see, e.g., draft Smart Document Specification—RC6.6, dated Sep. 19, 2002, which can be found at www.mismo.org, or more particularly: <<http://www.mismo.org/mismo/docs/drftspc/draft/EM_WG_SMARTDocSpec_DRAFT_RC66. pdf>>) A service provider may also provide a location through which appropriate electronic documents may be created pursuant to a proposed closing or other transaction.

Figure 2:
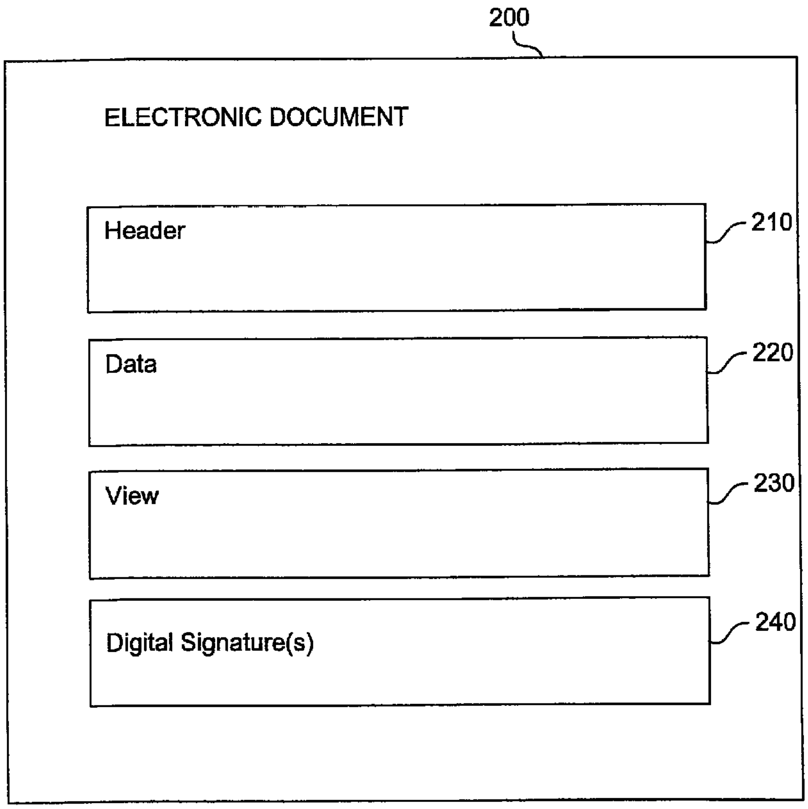
FIG. 2 is a block diagram illustrating components of an electronic document used in conjunction with an embodiment of closing assurance for expedited mortgage loan sales in accordance with the present invention.

FIG. 2 is a block diagram illustrating components of an electronic document used in conjunction with an embodiment of closing assurance based certification for expedited mortgage loan sales. Of course, other types and formats for electronic documents can be used in accordance with the present invention. The electronic document 200 includes a header section 210, a data section 220, and a view section 230. The electronic document 200 may also include a signature section 240 as part of its format; however, the signature section might not be used where paper closing documents are used, or the signature section 240 may merely indicate that paper documents were used and signed, in lieu of maintaining an electronic signature.

The electronic document 200 is preferably defined using a mark-up language. The electronic document 200 may be structurally altered depending upon the processing environment. For example, it may become desirable to strip one or more of header 210, data 220, view 230 and signature 240 sections from the electronic document 200 to facilitate processing, display, transmission, or for intended use. Particularly, an electronic document that is only intended for machine processing may at times only include the header and data sections 210, 220, or an electronic document that is only intended for viewing may not contain a data section 220 (e.g., a billing statement emailed to a client).

The header section 210 contains information about the document itself, such as its version, the type of document (e.g., that the document is a mortgage note, trial transcript, etc.) and whether or not all parties have signed. The data section 220 contains the information corresponding to that originating from an equivalent paper document, such as data from a mortgage note. The view section 230 contains tags that describe how to format and present the data contained in the document. For example, the view section 230 contains tags that describe how to format and present a printed mortgage note.

The header and data sections 210, 220 are preferably written in extensible markup language (XML) and the view section 230 is preferably written in extensible hypertext markup language (XHTML), which are conventional languages for creating electronic documents, although various alternative languages may be utilized. The names of the tags and the structure of XML documents are defined by a document type definition (DTD). The DTD associated with a particular electronic document describes the tags or markup and the structure of the document, and specifies which tags contain other tags. Conventional XML and XHTML programming techniques can be used to create the tags particular to content and format required by industry standards or the like.

The data section 220 can be organized using elements as well. For example, it may be generally demarcated by a "DATA" element that is subdivided into MAIN and MAP elements, with the MAIN element containing the XML structural description of the data model for the particular electronic mortgage document. For example, the MAIN element might incorporate LOAN (the terms and features of the loan, e.g., the interest rate and loan amount), BORROWER (information about the borrower), LENDER (information about the lender), PROPERTY (information about the property which is the subject of the mortgage), and EXECUTION (information about the date and location of the execution of the note) elements.

The MAP element generally links fields in the data section 220 to presentation fields in the view section 230. An electronic document may include more than one "view," so there may be a MAP element for each view that a DATA element is linked to. For example, if an electronic document contained three different view sections representing the data from a single data section, there would be three corresponding MAP elements within the DATA element.

The linking provided by the MAP element is preferably provided by elements that link values in the view section 230 to corresponding ones in the data section 220. There are various ways that a linking element can reference the necessary values, such as by including a pointer to a field in the data section 220 (e.g., in an attribute) and a pointer to a field in the view section 230 (e.g., in another attribute). Conversion elements may be associated with or contained by linking elements, to accommodate differences in format between the data and view sections.

FIGS. 6A-B illustrate an example of a listing 600 for an electronic document structurally configured according to the architecture of FIG. 2. This listing is not exhaustive, but is merely provided to illustrate where various data would be found within a so-configured electronic document. The listing 600 includes a header section 620, a data section 630 containing a main data section 660 and map section 670, a view section 640, and a signature section 650. The function of each of these sections is described in connection with the corresponding elements of FIG. 2. As is evident from the example MAIN section 660, fields and corresponding values are found therein, such as the illustrated MORTGAGE_TERMS InterestRatePercent which is shown to have the value "6". The electronic data set can be found in whole or in part in this MAIN section of the electronic document. That is, the fields that comprise the electronic data set are provided to the certifying agent, which determines whether the electronic document includes the fields, and then finds the corresponding values. As described above, the view section 640 is used to produce printed and displayed versions of documents. Additionally, affirmation that fields and corresponding values in the main data section 660 match those in the view section 640 is provided by using the ARC elements found in the MAP section 670. Each ARC element contains references to the fields and corresponding values. For example, as described, the main data section 660 identifies the InterestRatePercent to have the value "6". Similarly, the view section 640 provides a value "6" for the InterestRate field. The first ARC element found in the map section 670 associates these fields and values. During a validation of the electronic document, this ARC element is used to verify that the main data matches the view data for the interest rate field.

As described, the certifying agent can identify the electronic data set from the main data section. The mapping feature can also allow the certifying agent to verify that the paper mortgage documents match the data set. This verification involves: (1) the certifying agent being given some kind of indication that the paper closing documents were printed using an electronic document; and (2) the certifying agent understanding that the map section can be used to check that the paper closing document matches the data in the main data section for each of the fields in the electronic data set. The indication that the paper closing documents were printed using the electronic document could be provided in a standard communication from the closing agent to the certifying agent, or via the same from the lender. The electronic data set is provided to the certifying agent as described previously. That is, it may be in the form of an identification of each of the fields in the data set. The certifying agent can review the electronic document specification to confirm that a given electronic document contains all of the necessary fields, and that all of the necessary fields are verifiable, or may simply understand that it conforms to an industry standard known to include all of the necessary fields.

Figure 3A:
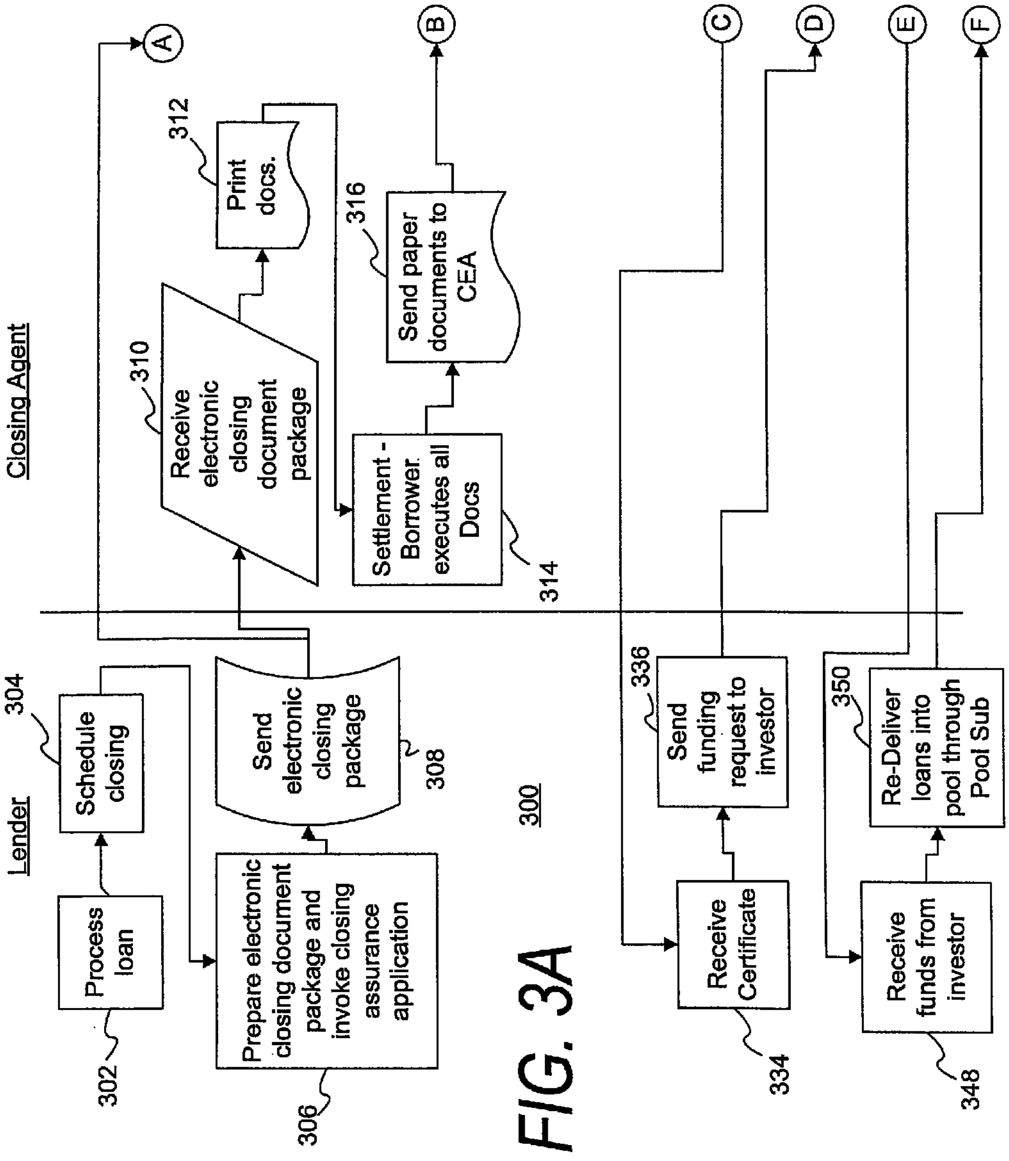
FIGS. 3A-B are flow diagrams illustrating another embodiment of closing assurance for expedited mortgage loan sales in accordance with the present invention.
Figure 3B:
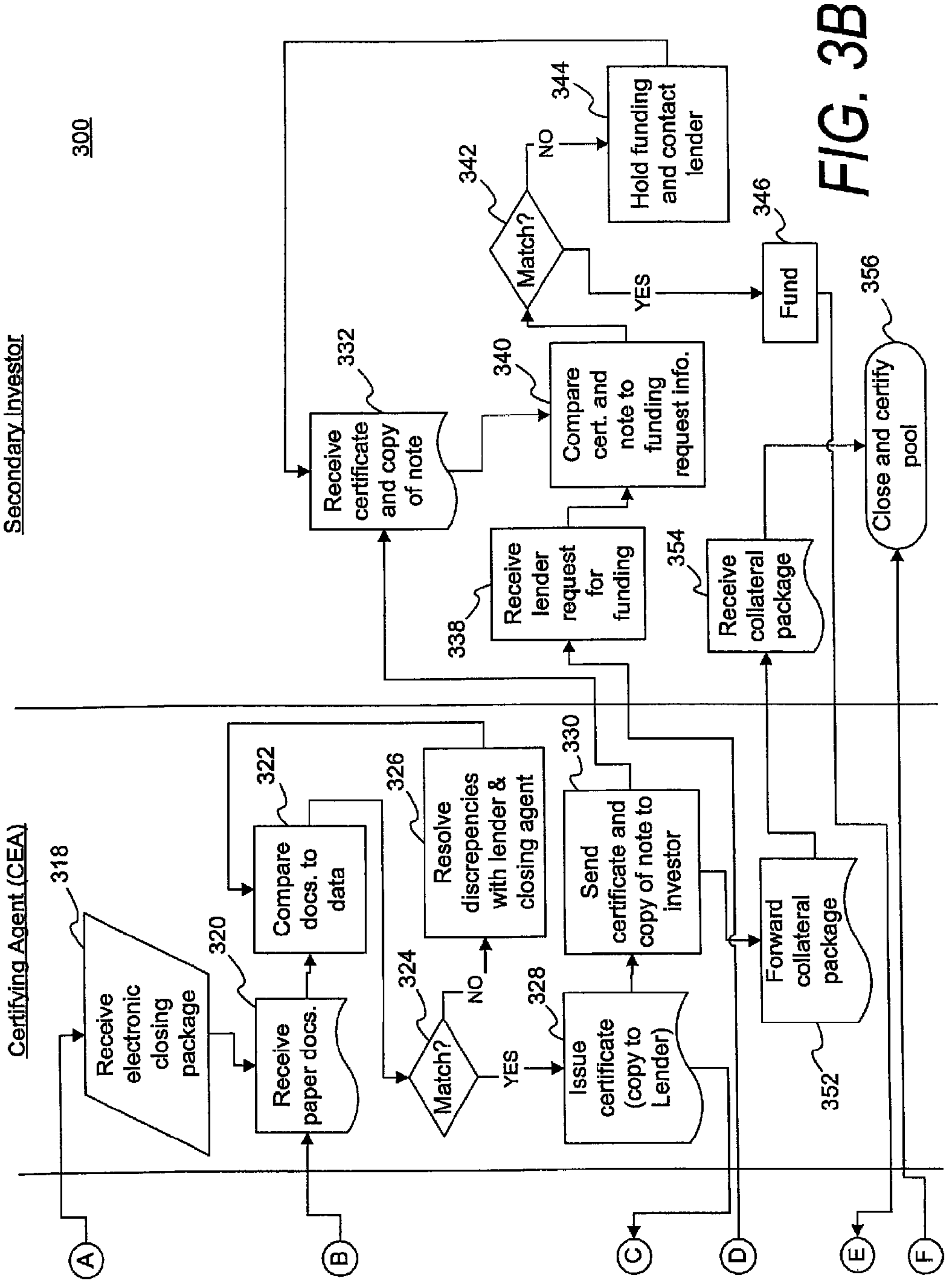

FIGS. 3A-B are flow diagrams illustrating another embodiment of an expedited lender funding process 300 in accordance with the present invention. The process 300 initiates where the lender processes a loan 302, such as by invoking the aforementioned LOS and/or underwriting applications, and schedules 304 a closing, in conventional fashion. The lender then prepares 306 a closing package comprising electronic document(s), and transmits 308 the electronic closing package to the closing agent and the certifying agent (CEA). As indicated, the closing package may contain multiple documents such as a mortgage note, security instrument, RESPA required documents, and others. The electronic closing package may be variously embodied. For example, a single "electronic document" containing views corresponding to the different paper documents could be provided, or an archive file format, such as a conventional Java™ JAR file, or a ZIP file could contain multiple electronic documents respectively corresponding to the different required documents can be provided.

The closing agent receives 310 the electronic closing package and prints 312 the documents necessary for the closing. Preferably, the closing package contains electronic documents similar to those previously described, wherein a main data section includes data that can be separately parsed from a view section, which view section contains formatting information for creating printed (or otherwise displayed) versions of documents corresponding to the data from the main data section. Accordingly, the electronic document package is used to produce a printed version of the mortgage note, and other documents used pursuant to the closing. The printed documents are then used for a conventional settlement 314 wherein the borrower executes any and all necessary documents to complete the closing, by signing paper documents using an ink pen or the like. The paper documents, executed by the borrowers, are then sent 316 to the CEA, which receives 320 them and also receives 318 the electronic closing document package from the lender. The CEA then compares 322 the paper documents to the data contained in the electronic documents and determines 324 whether they match for the fields defined by the data set. As indicated, an electronic data set is typically sent to the certifying agent. This can be done at any time, prior to the closing, or in conjunction with sending the executed closing documents to the certifying agent, or thereafter.

There will be various alternatives for this procedure, but each will involve a determination that the values in the paper mortgage document match those in the corresponding electronic document for each field in the data set. For example, the comparison may involve the CEA visually inspecting the paper documents and comparing the values found in the paper documents to those in the electronic data set from the electronic document. Alternatively, the CEA can receive an assurance that the executed paper mortgage document from the closing was based upon a print made from the electronic document, and then perform an electronic document validation that ensures that the print matches the electronic data set found in the electronic document. For example, the above described mapping (e.g., ARC) elements for each of the necessary fields can be used to determine whether a document printed from an electronic document view section matches the main data in the electronic document.

Where there are any discrepancies between the electronic documents and the printed documents, such discrepancies are resolved 326 with the lender and the closing agent. For example, the electronic document may be updated to reflect "white outs" or other manual modifications (e.g., initialed changes) that were made at the closing. After an update, the CEA may re-examine the updated electronic document against the paper from the closing to finally complete the comparison 322.

As introduced above, the definition of what constitutes an electronic data set will vary depending upon factors including industry standards and agreements between the parties, and an exemplary data set is provided in Table I above. The CEA can use a checklist of terms during the matching operation. Alternatively, an electronic document may include information, such as in its header, which immediately identifies it as including the required characteristics for a transaction, which would mean that it would have the required data set, among other things.

Although matching is shown as one part of the certification process, a certificate may also represent other determinations, such as proper execution of forms, and, especially where standards are not incorporated into the electronic document standard, determinations that proper forms were used for the particular transaction involved.

The CEA issues 328 a certificate after it is determined that the paper documents match the electronic documents. In one embodiment, the certificate provides the following representations and warranties: that the electronic and printed documents are identical in form; that for a given data set, the printed documents match a corresponding electronic data set; that the printed documents were signed properly pursuant to the closing; and that funds were properly disbursed (typically to the borrower). The certificate may of course include more or less representations. Others include that a particular note format was used (e.g., for the State or product), that the note was signed as drawn, or a guarantee to the validity and the identity of the signers. Although the certificate is preferably related to a contract among the lender, investor and certifying agent, in one alternative, the certificate evidences the lender having obtained an electronic surety policy covering the above-described representations and warranties, with the investor being designated as a beneficiary the policy along with the lender.

The CEA issues the certificate and a copy of the certificate is sent 328 to the lender. Also, a copy of the certificate is sent 330 to the investor, as is a copy of the note. This information may be variously sent, such as through e-mail messages containing PDF attachments for the certificate and the note (and any other necessary documents). The electronic data set may also be sent to the investor at this time. Where electronic documents are used, those may be transmitted to the investor, or the investor may otherwise obtain the electronic document, such as from the lender or the service provider used to create the electronic document.

The lender receives 334 the certificate and sends 336 a funding request to the investor. This sequence is not required, as the funding request may have been previously sent. Various conventional formats and protocols for making the funding request can be used, such as those implemented by Funding Express® and/or MORENET as provided by Fannie Mae.

These funding requests would have associated pertinent data that is later used to match certificates and notes received from the CEA to corresponding funding requests. The investor also receives 332 the certificate and copy of the note, performs a comparison 340 of the certificate and note to the funding request information, and sends 346 funds to the lender upon a determination 342 of a match between the funding request information, the note, and the certificate. The investor may apply conventional back-end checking of data in the note as well, if desired. The information used to match 342 the funding request to the certificate and note can be done through examination of key pertinent data, such as the borrower name, loan amount, interest rate, term, property address, etc. The key pertinent data parameters may or may not be the same as the fields in the electronic data set. Alternatively, a unique identifier may be used to correlate the funding request to the certificate and note.

Funding in accordance with embodiments of the present invention can also work in conjunction with established funding protocols that are implemented between lenders and investors. For example, funding options might include processes that provide the lender with early payment for a loan to be sold to an investor. Funds are typically sent to the lender in advance of pooling or pool settlement date (and a fee charged to the lender), subject to established credit limits. Once the lender determines the final disposition of the loan (e.g., to be sold as Cash or MBS—tied to a specific commitment/forward sale) the loan is "re-delivered' to the investor—at which point the investor will settle up"—any additional monies to/due from the lender based on the early funding plus the fee component.

Alternatively, with a direct sale, documents are typically received and validated by either investor's custodial function or a 3$^{rd}$ party custodian. There is no "settle up" period because the price and delivery has already been established.

According to this embodiment, collateral can also be more efficiently delivered from the closing table, such as in support of mortgage pool closing and certification. In conventional practices, once the loan is closed, the Closing Agent may conduct a quick check to ensure all the documents are signed and in a specific order (may also ensure Closing Instructions are complete). Upon satisfactory review, they will package the documents and return them to the lender. Alternatively, if a warehouse lender is involved (has funded the loan on behalf of the mortgage lender), they may require the Closing Agent to forward the "Collateral" documents (usually defined as the Note and any document modifying the Note) to their designated place of business, with the remaining package (along with copies of the Note and other does forwarded to the Warehouse Lender) being returned to the Mortgage lender via Fed Ex.

With this embodiment, once the loan closes, the Closing Agent may conduct a quick check to ensure all the documents are signed and in a specific order (may also ensure Closing Instructions are complete). Upon satisfactory review, they will forward the complete package to the CEA. Upon completion of the review and issuance of certificate, the CEA forwards 352 the original Note (and any other delivery documents) for receipt 354 by the investor, and any remaining closing documents back to the Lender with respective copies of the Note and other delivery documents (such as via Fed Ex). Then, after receiving 348 funds from the investor, the lender re-delivers 350 loans into a pool (or cash), and the investor closes and certifies 356 the pool. Although there may be a conventional lag in closing the pool, funding is provided to the lender well prior to this event because of the described closing assurance based expedited funding.

Figure 4A:
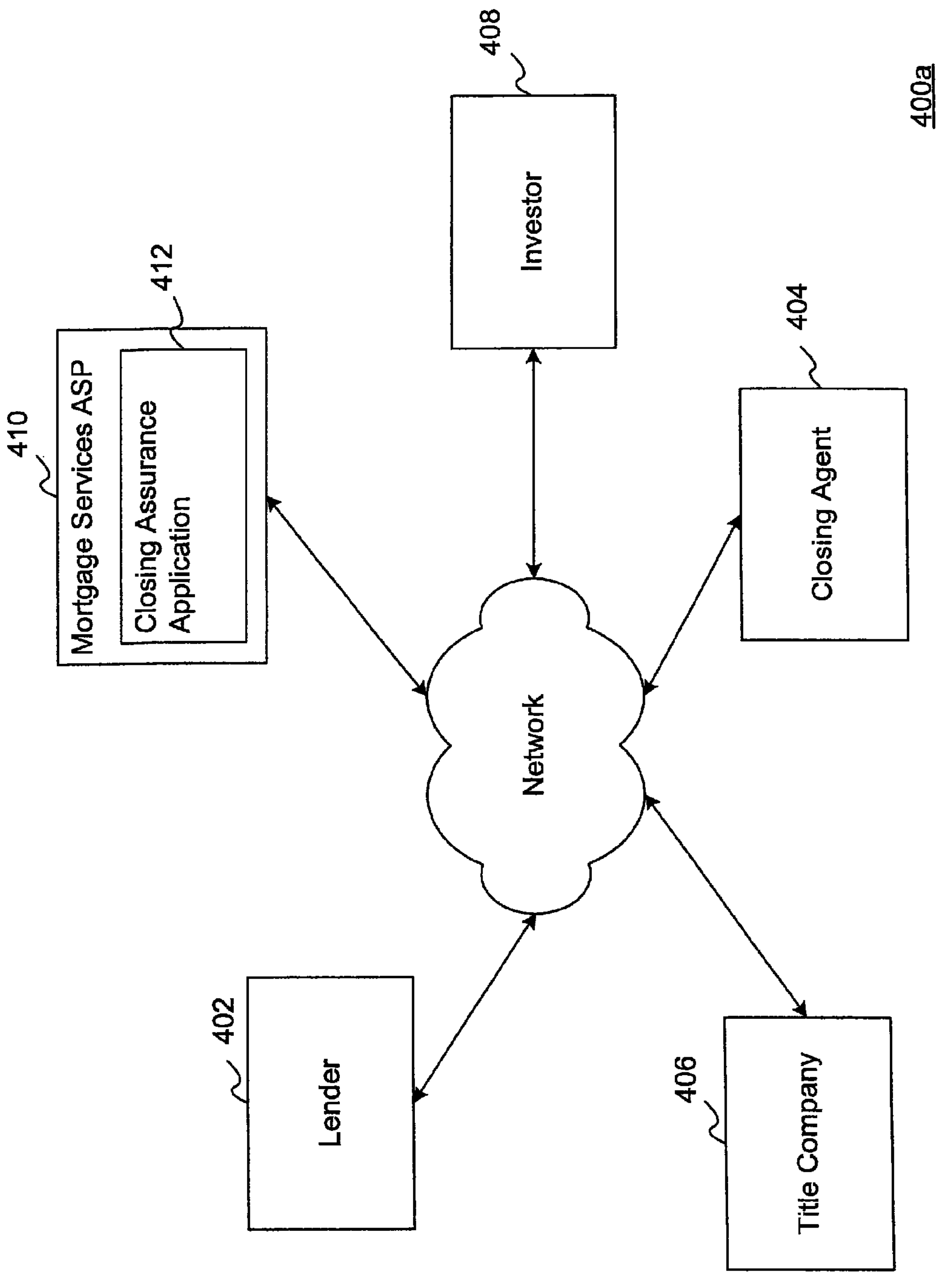
FIGS. 4A-B are schematic diagrams illustrating examples of systems in which expedited mortgage loan sales can be provided in accordance with the present invention.
Figure 4B:
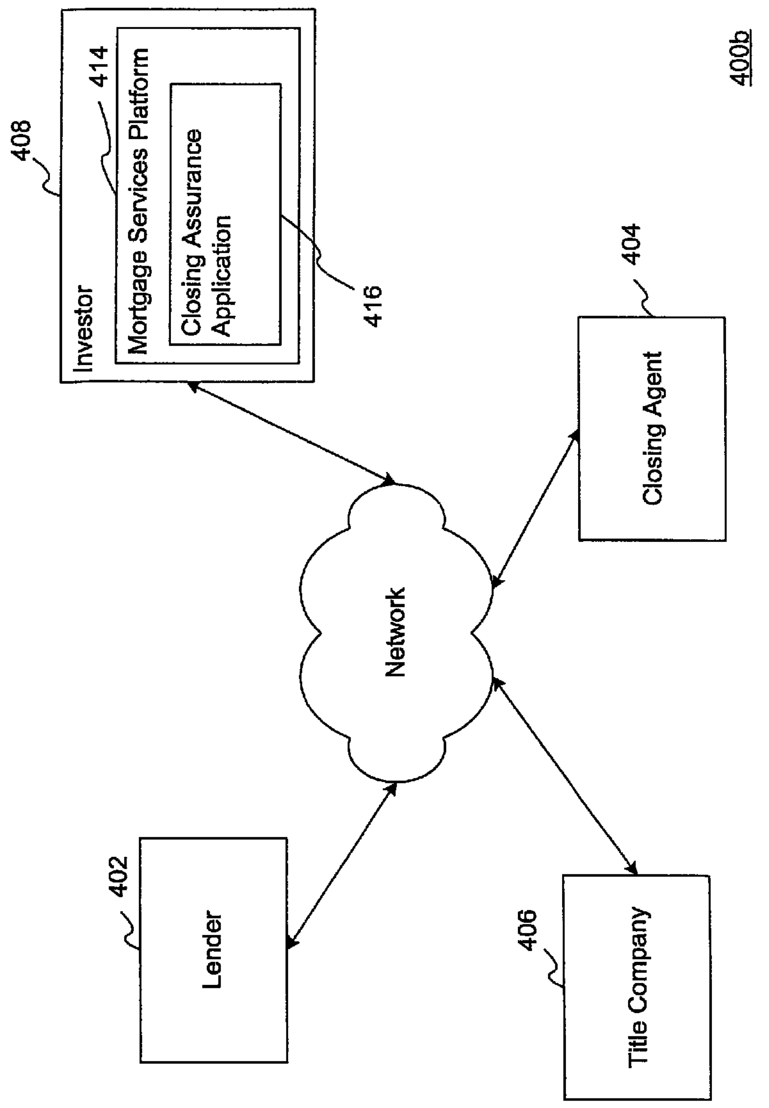

As described above, it should be recognized that there will be various alternatives to the described processes, such as a merger of the closing agent and the certifying agent activities. Additionally, although an investor in a secondary market is described in certain embodiments as the purchaser of a mortgage from a lender, there are other applications. For example, the investor, or funding provider, may be a warehouse lender, which is a short-term lender for mortgage bankers. Using the note as collateral, the warehouse lender provides interim financing until the mortgage is sold to a permanent investor. Some funding providers, such as the warehouse lender, may require certificates having different representations than those provided in a certificate required by an investor in the secondary mortgage market. For example, the funding provider may omit a requirement of a representation that an executed paper mortgage document has fields and corresponding values that match a dataset, merely requiring representations that the paper mortgage document was properly executed pursuant to the closing and that funds were appropriately disbursed for the mortgage FIGS. 4A-B are schematic diagrams illustrating examples of computer systems 400*a*, 400*b* in which closing assurance based expedited mortgage loan sales can be provided in accordance with the present invention. In one system 400*a*, the lender 402, closing agent 404, title company 406, and investor 408 are shown. Each of these parties 402-408 can be interconnected by a public network such as the Internet, and they can variously communicate using conventional architectures and protocols, such as according to a client server model implementing the TCP/IP communication protocol suite, and any necessary protocols for transmitting, accessing, displaying, printing, and otherwise using the above described electronic documents. Alternatively, a private network, a combination or public and private networks, or any conventional arrangement for conducting communications appropriate for the described subject matter can interconnect the parties.

The parties also have access to a mortgage services ASP 410, which variously registers the different parties and allows appropriate activities for mortgage transactions. For example, the mortgage services ASP 410 may communicate with the lender 402 to create electronic documents for a closing package. This activity may be complemented by communications with the investor 408, who may provide assistance and information for loan origination and underwriting purposes. The closing agent 404 and title company 406, which may serve as the certifying agent, also can access the electronic documents, such as through receipt of the electronic closing package, etc.

As indicated in FIG. 4B, in some systems 400*b* a mortgage services platform 414 may be provided by one of the parties 402-408. Particularly, the investor may provide the mortgage services platform 414, which would provide services similar to the mortgage services ASP (410). In either case, the mortgage services preferably include a closing assurance application 412, which may also be referred to as a closing assurance product.

Figure 5:
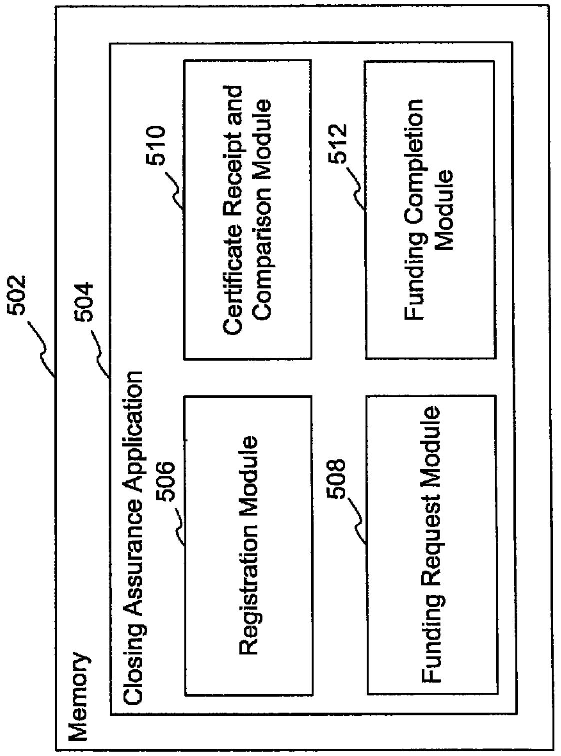
FIG. 5 is a block diagram illustrating an embodiment of a closing assurance application in accordance with the present invention.

FIG. 5 is a block diagram illustrating an embodiment of a closing assurance application 504. Here, the closing assurance application may be embodied as a software product that may be stored in various types of computer media 502, such as a floppy or optical disc, or RAM found in a computer system wherein a processor execute the instructions stored in memory, to perform desired functions. The closing assurance application 504 includes a registration module 506, a funding request module 508, a certificate receipt and comparison module 510, and a funding completion module 512.

The registration module 506 allows various users to register with the system, and will typically be connected to the registration system of the mortgage services platform. For example, a lender may register, and request use of the closing assurance product for a given mortgage or set of mortgages being originated or underwritten through the mortgage services platform. The closing assurance application 504 automatically associates the closing assurance procedures to any so designated mortgages. Setting an attribute in an electronic document to indicate that it is subject to closing assurance can accomplish automatic association of closing assurance to a note and funding request. Specifically, a particular "closing assurance" attribute can be part of an electronic document specification. It may thus be presented as an indication "Closing_Assurance=Yes" within the electronic document. Alternatively, the investor may associate the investor loan number with a request to use the closing assurance product, and maintain the association in a database. When the subject note arrives, receiving the loan number, which is part of the electronic document, and checking the database determine closing assurance applicability. The certificate receipt and comparison module 510 contains routines and interfaces for managing the receipt of certificates and related information, such as from CEAs (e.g., the title company). The funding request module 508 allows lenders to provide information for funding, and to submit funding requests. Preferably, the request module 508 uses the conventional funding request functionality found on the mortgage services platform. An example of such conventional funding request functionality is provided by Funding Express® on the MORNETPlus® platform.

The CEA also registers with closing assurance application and may conduct a conventional login procedure in order to submit certificates and related information, such as mortgage notes and data sets. Alternatively, e-mail based messages containing PDFs of the certificate and note, and an attached electronic data set may be automatically recognized as having been sent by a CEA using conventional techniques, and then appropriately treated thereafter. As indicated, a preferred certificate provides the following representations: the CEA has reviewed the paper mortgage document and determined that it contains the fields and corresponding values found in an electronic data set; that the note was properly executed pursuant to the closing; that the note was signed as drawn; and that funds were disbursed to the appropriate recipient (typically the borrower for a conventional first closing). The certificate receipt and comparison module 510 may merely send a message to an operator indicating receipt of the certificate and requesting confirmation in conjunction with a previously or subsequently received funding request. Graphical interfaces are provided to allow the operator to navigate among displays corresponding to the certificate, the mortgage note, and any other necessary document. Alternatively, the representation of the mortgage note could be automatically inspected, such as through conventional character recognition techniques combined with knowledge of the document format, in order to determine whether relevant fields match the values in the data set. The results of this inspection could assist the operator by giving preliminary comparison results. Additionally, as described above, key pertinent data is used to confirm that the received certificate and mortgage note correspond to the funding request. This can be done automatically since the system will have the data from the funding request and the corresponding data from the note. Alternatively, it can be displayed for manual confirmation that the funding request is appropriately associated to the note. This confirmation is passed to the funding completion module 512, which accommodates sending the funds to the lender in conventional fashion.

Figure 7:
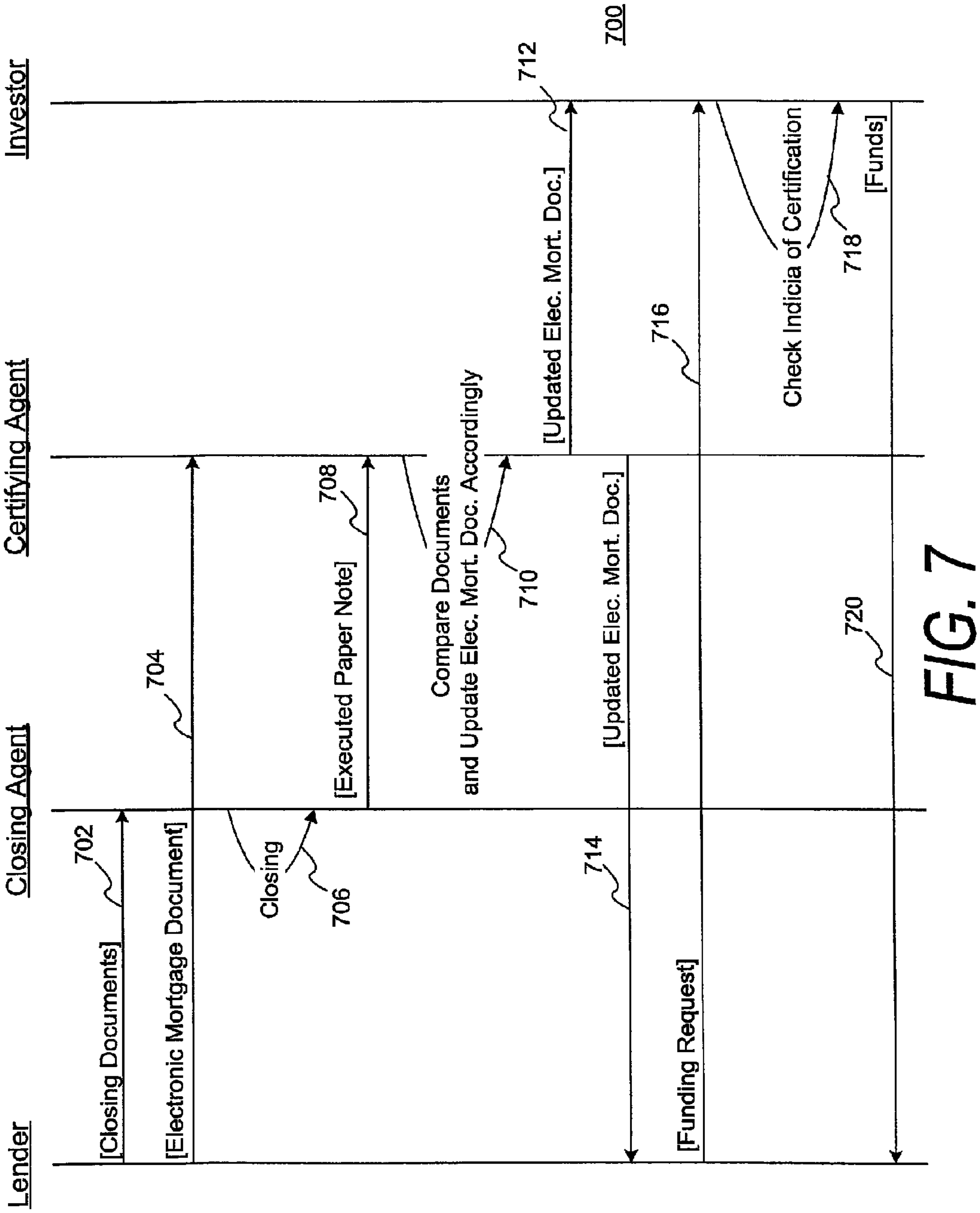
FIG. 7 is an event diagram illustrating an embodiment of certifying an electronic document in accordance with the present invention.

FIG. 7 is an event diagram illustrating an embodiment of certifying an electronic document in accordance with the present invention. In this embodiment, a certifying agent receives an electronic document and a corresponding paper document that had been executed pursuant to some transaction. The certifying agent compares the information contained in the paper to that in the electronic mortgage document. If the paper adequately corresponds to the electronic document (e.g., where all of the values for relevant fields in the paper document match those in the electronic document) and is otherwise sufficient (e.g., proper execution, related funds disbursement), then the certifying agent certifies the electronic document so that other parties can reliably engage in transactions involving the electronic document without having to possess or otherwise inspect the executed paper document. Preferably, certification involves application of some form of indicia of certification to the electronic document, as described further below. Applying "indicia of certification" refers to applying any one or more indicators of certification to the electronic document. Thus updating the electronic document to include a single indicator of certification (such as updating a single field) can constitute "indicia of certification" as used herein. Although this embodiment of the present invention is applicable to any electronic document and corresponding executed paper document involving any transaction, the embodiment is described with reference to an electronic mortgage document and corresponding mortgage transactions.

Referring to the process 700 of FIG. 7, closing documents are initially sent 702 to the closing agent for completion of the closing. As with the process of FIG. 1, this process 700 is applied to a mortgage note, which is thus preferably included among the closing documents, along with other typically provided documents. Again, the closing documents can be sent using traditional paper document carriers, or may be electronically sent to the closing agent for printing and assembly of the closing package. There are also similar alternatives for conveying the documents to the closing agent, including other types of carriers or having the closing agent access the documents from a database or the like.

Preferably, the lender uses a formal electronic document in creating the closing package, even though the closing will implement paper. Although any format that is accepted according to industry practice for a given transaction may be applied, one preferred format is based upon the one published by MISMO for mortgage transactions, as described above, plus features consistent with certification in accordance with the present invention. The electronic document can be sent 704 to the certifying agent and other parties to transactions related to the mortgage. The electronic document will typically include a data section that contains numerous fields and corresponding values for at least one closing document (e.g., the note). The electronic mortgage document can be sent to the certifying agent using conventional electronic mail, although various techniques including but not limited to postal service, facsimile, electronic data transfer may be used. As with the process of FIG. 1, the certifying agent may be a traditional title company, although there are various alternatives, including in house certification by the lender, investor, closing agent, or other party.

The closing agent obtains paper closing documents by receiving them in paper form from the lender, by printing them based on an electronic document, by generating them based upon a comprehensive electronic data set, or through other means. The closing agent then conducts a conventional closing 706, wherein the documents are reviewed and executed by relevant parties, such as the borrowers. The executed documents include the mortgage note. The executed closing documents are sent 708 to the certifying agent, again using conventional means for sending paper documents.

The certifying agent then compares the executed closing documents to the electronic mortgage document, and updates the electronic mortgage document to include indicia of certification (event 710) where appropriate. The indicia of certification will later be accessible by other parties who wish to engage in transactions based upon the electronic mortgage document without requiring them to review the data or associated aspects of the paper mortgage document. Generally, certification will be applied by the certifying agent based upon certification factors similar to those described in connection with the process of FIG. 1. For example, one certification representation is that the certifying agent has reviewed the executed paper mortgage document and determined that for a given data set (e.g., all relevant values for fields in the electronic mortgage document that have counterparts in the paper mortgage document), the paper mortgage document substantially matches electronic mortgage document. Other potential representations include that the paper mortgage document was properly executed pursuant to the closing, that funds were disbursed from the lender to an appropriate recipient, and that the paper mortgage document was signed as drawn.

The legal relationship between the lender, investor and certifying agent can also be established in connection with certification as desired. Certification can for example be performed by the certifying agent pursuant to a contract involving the lender, certifying agent, and the investor, wherein the certifying agent issues the certificate and is liable for failure of any of the associated representations, or various alternatives including a surety policy that is obtained by the lender based upon certification by the agent, to which the investor and lender are beneficiaries.

Referring to FIGS. 8A-B along with FIG. 7, an example of the format for the electronic mortgage document 800 updated to include indicia of certification is described. Generally, the format of the updated electronic mortgage document 800 corresponds to the format of the electronic mortgage document of FIGS. 6A-B (600), with modifications to reflect certification. These include updating its header to reflect certification, and application of a digital signature to the electronic mortgage document.

The electronic mortgage document 800 of FIGS. 8A-B includes header 820, data 830*a-b*, view 840 and signature 850 sections. The header section 820 includes information about the type of electronic document as well as status information. For example, the electronic mortgage document is identified as having the value "note" for its type. The state of the electronic mortgage document 800 is also described in the header. Various states can be provided depending upon the application and the desired process to be applied to the document. For example, the state can be indicated as "populated" indicating that the document has been filled in or completed with data, or as "signable," meaning that is both populated and specifies all signers with placeholders for signature lines. One indicia of certification is to update this state field to indicate "certified" as shown. Here, the designation of the STATE is changed from populated (or signable, if the electronic document included placeholders notwithstanding the paper mortgage closing), to certified, based upon completion of the above described certification steps by the certifying agent.

Another indicia of certification is the application of an electronic or digital signature to the electronic mortgage document by the certifying agent. Additionally, the view section 840 may include presentation formatting for creating a view or display of a certificate that is issued by the certifying agent. For example, the view section 840 may provide a printable certificate that indicates the above-described representations (data comparison, proper execution, funds disbursement, etc.). Or, as indicated, the certificate may simply state that the certifying agent compared the electronic document to the executed paper, certifying that they match and that parties may reliably engage in transactions involving the electronic mortgage document.

The signature section 850 is updated to include the signature of the certifying agent upon certification. The SIGNATURES element can be updated to include any conventional type of signature, includes digital and electronic signatures. For example, a digital signature can use the W3C XML signature specification. The electronic document may also be optionally tamper sealed. For example, a tamper seal can be applied in the form of a digital signature having as its target the entire view section. The tamper seal wraps the entire view, including the information corresponding to the note (borrower, etc.), as well as the certificate. The optional SIG_MODEL element in the header 820 provides an efficient indication of signature by the certification and if applicable tamper sealing.

The electronic mortgage document is thus updated to include indicia of certification. Parties can receive the updated electronic mortgage document and engage in transactions in reliance upon the certification representations provided by the certifying agent. For the type of transaction shown in FIGS. 7A-B (expedited provision of purchase proceeds from an investor to a lender), the updated electronic mortgage document can be sent 712, 714 to the lender and investor, possibly along with remaining delivery documents. The electronic mortgage document can be variously sent to the parties, or its presence at some location may be noted for access by the parties. Any conventional mechanism including electronic mail for sending the electronic mortgage document to various parties (or access through a conventional Internet or private network connection) can be provided.

As with the process of FIG. 1, here the lender requests the purchase proceeds for sale of the mortgage to the investor. This involves sending 716 at some point a funding request to the investor, who then checks 718 the electronic mortgage document for appropriate indicia of certification (e.g., one or more of checking the header information, checking the digital signature, checking an exact copy of the electronic mortgage document against a trusted registry). If the electronic mortgage document is appropriately certified, the investor then performs conventional verification of the funding request to correlate it to the electronic mortgage document, as described in connection with FIG. 1 above. The investor then can send 720 purchase proceeds to the lender, using conventional models (e.g., direct sale, pooled, etc.).

Figure 10:
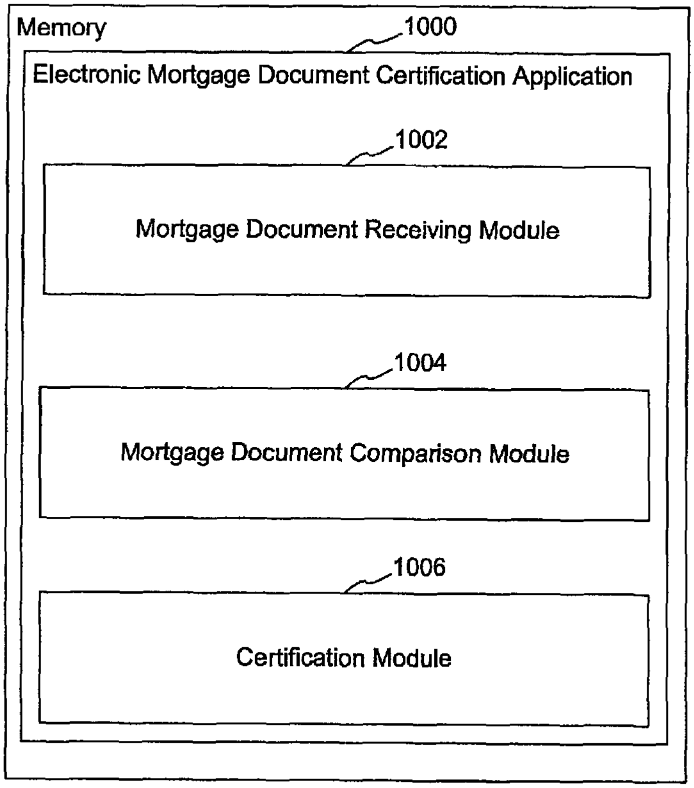
FIG. 10 is a block diagram illustrating an embodiment of an electronic mortgage document certification application in accordance with the present invention.

Certifying or reliably transacting on a certified electronic mortgage per the above can be variously embodied, including processes, computer implemented methods, computer program products, computer systems and networks, user interfaces, application programming interfaces, and the like. For example, a computer can execute instructions to perform the above-described actions, or software with instructions for performing such actions can be stored. FIG. 10 illustrates one embodiment of a mortgage document certification application 1000 including a mortgage document receiving module 1002, a mortgage document comparison module 1004, and a certification module 1006. The mortgage document receiving module 1002 includes software for receiving the electronic mortgage document, and comprises routines for receiving a file including such a document. For example, the electronic mortgage document can be transmitted using conventional e-mail, and may be contained within a single file, or may be contained along with multiple files in an archive file format such as the previously mentioned JAR file. Any kind of electronic mortgage document, regardless of format, can be implemented.

The mortgage document receiving module 1002 also is configurable to receive a version of the executed paper mortgage document, such as by receiving a PDF file corresponding thereto. This can also be received via e-mail that can be sent to the certifying agent as described above.

In one embodiment, the previously introduced electronic mortgage document that has VIEW and MAIN data sections is used, with corresponding validation based upon determinations that the values producing a display using the VIEW section match those found in the main data section, using ARC elements that connect values found in the respective sections. This provides a verification that a display corresponds to the main data to be parsed during typical mortgage transactions. The display can be prints, computer monitor displays, or the like, produced using the document definitions in the VIEW section.

The mortgage document comparison module 1004 includes routines that facilitate the comparison of the executed paper mortgage document to the electronic mortgage document for the purposes of determining whether the above described certification is appropriate. In one embodiment, this comprises a side by side display of the printed mortgage document and the corresponding display produced from the electronic mortgage document. Such an interface allows the operator to easily compare the paper mortgage document to the electronic mortgage document. It may also include a validation indication that allows the operator to confirm that the underlying data in the electronic mortgage document matches that used to produce the view section based display. Alternatively, mechanisms for automatically assisting in the comparison, such as those involving application of optical character recognition to the executed paper mortgage document, and identification of fields and corresponding values using conventional lexical stream parsing applied to the scanned paper mortgage document can be provided by the mortgage document comparison module 1004. Regardless of how the comparison is conducted, the terms of what will constitute certification can vary, as described above, but in one embodiment can constitute a determination that the executed paper matches the corresponding electronic mortgage document, and possibly other determinations such as proper execution and disbursement of funds, as described.

The certification module 1006 includes routines that allow the electronic document to be updated to provide indicia of certification. This can include updating a field corresponding to the document state in a header of the electronic mortgage document, and/or applying a digital signature to the electronic mortgage document corresponding to the certifying agent, both as described above. Either of both of these can be facilitated using conventional programming techniques, such as those according to the W3C XML digital signature specification.

Figure 9:
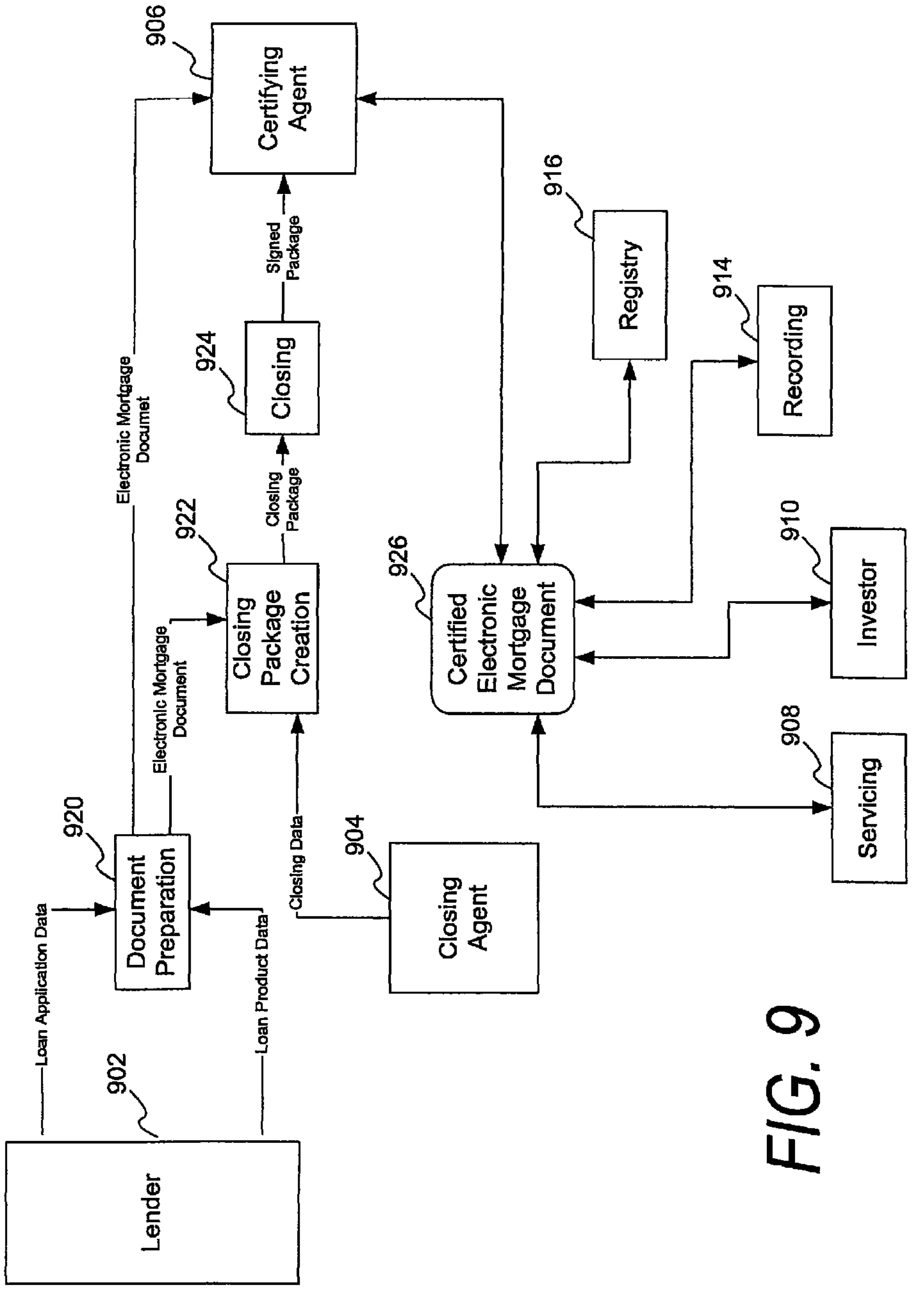
FIG. 9 is a schematic diagram illustrating an application of certification and examples of corresponding certified electronic document transactions in accordance with the present invention.

As indicated, transactions other than sending purchase proceeds to a lender pursuant to a mortgage purchase can be supported. The schematic diagram of FIG. 9 provides an overview of various examples of transactions in the life cycle of an electronic mortgage document. Participants in the illustrated process include the lender 902, closing agent 904, certifying agent 906, servicer 908, investor 910, recorder 912 (e.g., County Recorder) and registry 914. Where electronic documents are being handled, these parties 902-914 can variously communicate over a computer network to effect a mortgage transaction utilizing the certified electronic mortgage document, such as those previously described between the lender, certifying agent, and investor.

Loan documents are prepared 920, such as via a lender's loan origination system (LOS). The electronic document can reside on the LOS or can be uploaded from a document preparer located at a remote location via the computer network. The closing agent 904 receives closing instructions from the lender and the closing documents. Closing package creation 922 can be centralized so that the lender 902 and closing agent 904 can provide the necessary closing data and electronic documents to complete a closing package. Additionally, the closing agent 904 can invoke information provided by the lender 902, and vice versa.

As described, upon completion of the closing package, a conventional closing 924 involving an ink and pen signing of relevant documents including the paper mortgage note follows, with the borrower signing the necessary documents in conventional fashion. The signed documents are then sent to the certifying agent 906, who performs the above described certification process and updates the electronic mortgage document to reflect certification, as indicated by the "Certified Electronic Mortgage Document" 926. The certified electronic mortgage document is then accessible for any number of related transactions that previously required at least some form of inspection or possession of the paper mortgage document. For example, the electronic mortgage document can be electronically provided for recording 912 (and can be updated to reflect recordation). The certified electronic mortgage document can also be provided to the investor 902 as described above, or can be registered 914, or provided to a loan servicing provider 908, as indicated, or provided for any conventional transaction. Each of these parties can rely upon the certification applied to the electronic mortgage document and then engage in a conventional transactional practice, without requiring inspection of the executed paper.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for reliably transacting on an electronic mortgage document corresponding to an executed paper mortgage document that had been ink pen executed pursuant to a mortgage loan closing, the method comprising:

receiving, by a computer, the electronic mortgage document corresponding to the mortgage loan closing:

the electronic mortgage document being representative of but separate from the executed paper mortgage document, the electronic mortgage document including an electronic version of a set of data corresponding to a set of data found in the executed paper mortgage document;

determining whether the electronic mortgage document includes an indicia of certification, the indicia of certification representing that the electronic mortgage document has been compared to the paper mortgage document, that the electronic version of the set of data matches the corresponding set of data in the executed paper mortgage document, and that a party can reliably transact on the electronic mortgage document without requiring further inspection of the executed paper mortgage document; and transacting on the electronic mortgage document without requiring further inspection of the paper mortgage document, in reliance upon the indicia of certification.

2. The method of claim 1, wherein the indicia of certification represents that the paper mortgage document was properly executed pursuant to the mortgage loan closing.

3. The method of claim 2, wherein the indicia of certification represents that funds were disbursed from a lender to an appropriate recipient pursuant to the mortgage loan closing.

4. The method of claim 3, wherein the appropriate recipient is the borrower.

5. The method of claim 1, wherein the indicia of certification represents that the paper mortgage document was signed as drawn pursuant to the mortgage loan closing.

6. The method of claim 1, wherein the paper mortgage document is a promissory note.

7. The method of claim 1, wherein a certifying agent applies the indicia of certification to the electronic mortgage document.

8. The method of claim 7, wherein the indicia of certification includes a digital signature corresponding to the certifying agent that is integrated with the electronic mortgage document.

9. The method of claim 7, wherein the indicia of certification includes a modification of the electronic mortgage document to indicate certification.

10. The method of claim 8, wherein the indicia of certification includes a modification of the electronic mortgage document to indicate certification, the modification comprising setting a value for a header field designated for indicating certification.

11. The method of claim 1, wherein transacting on the electronic mortgage document comprises sending purchase proceeds to a lender pursuant to a purchase in a secondary mortgage market.

12. The method of claim 1, wherein transacting on the electronic mortgage document comprises receiving purchase proceeds from an investor pursuant to a sale in a secondary mortgage market.

13. An apparatus for reliably transacting on an electronic mortgage document corresponding to an executed paper mortgage document that had been ink pen executed pursuant to a mortgage loan closing, the apparatus comprising:

means for receiving an electronic mortgage document corresponding to the mortgage loan closing, the electronic mortgage document being representative of but separate from the executed paper mortgage document, the electronic mortgage document including an electronic version of a set of data corresponding to a set of data found in the executed paper mortgage document;

means for determining whether the electronic mortgage document includes an indicia of certification, the indicia of certification representing that the electronic mortgage document has been compared to the paper mortgage document, that the electronic version of the set of data matches the corresponding set of data in the executed paper mortgage document, and that a party can reliably transact on the electronic mortgage document without requiring further inspection of the executed paper mortgage document; and means for transacting on the electronic mortgage document without requiring further inspection of the paper mortgage document, in reliance upon the indicia of certification.

14. The apparatus of claim 13, wherein the indicia of certification represents that the paper mortgage document was properly executed pursuant to the mortgage loan closing.

15. The apparatus of claim 14, wherein the indicia of certification represents that funds were disbursed from a lender to an appropriate recipient pursuant to the mortgage loan closing.

16. The apparatus of claim 15, wherein the appropriate recipient is the borrower.

17. The apparatus of claim 13, wherein the indicia of certification represents that the paper mortgage document was signed as drawn pursuant to the mortgage loan closing.

18. The apparatus of claim 13, wherein the paper mortgage document is a promissory note.

19. The apparatus of claim 13, wherein a certifying agent applies the indicia of certification to the electronic mortgage document.

20. The apparatus of claim 19, wherein the indicia of certification includes a digital signature corresponding to the certifying agent that is integrated with the electronic mortgage document.

21. The apparatus of claim 19, wherein the indicia of certification includes a modification of the electronic mortgage document to indicate certification.

22. The apparatus of claim 20, wherein the indicia of certification includes a modification of the electronic mortgage document to indicate certification, the modification comprising setting a value for a header field designated for indicating certification.

23. The apparatus of claim 13, wherein transacting on the electronic mortgage document comprises sending purchase proceeds to a lender pursuant to a purchase in a secondary mortgage market.

24. The apparatus of claim 13, wherein transacting on the electronic mortgage document comprises receiving purchase proceeds from an investor pursuant to a sale in a secondary mortgage market.

25. An apparatus for reliably transacting on an electronic mortgage document corresponding to an executed paper mortgage document that had been ink pen executed pursuant to a mortgage loan closing, the apparatus comprising:

a processing unit; and a memory, the memory storing program code executable by the processing unit to perform operations comprising:

receiving the electronic mortgage document corresponding to the mortgage loan closing, the electronic mortgage document being representative of but separate from the executed paper mortgage document, the electronic mortgage document including an electronic version of a set of data corresponding to a set of data found in the executed paper mortgage document;

determining whether the electronic mortgage document includes an indicia of certification, the indicia of certification representing that the electronic mortgage document has been compared to the paper mortgage document, that the electronic version of the set of data matches the corresponding set of data in the executed paper mortgage document, and that a party can reliably transact on the electronic mortgage document without requiring further inspection of the executed paper mortgage document; and transacting on the electronic mortgage document without requiring further inspection of the paper mortgage document, in reliance upon the indicia of certification.

26. The apparatus of claim 25, wherein the indicia of certification includes a modification of the electronic mortgage document to indicate certification.

27. The apparatus of claim 25, wherein the indicia of certification includes a modification of the electronic mortgage document to indicate certification, the modification comprising setting a value for a header field designated for indicating certification.

28. The apparatus of claim 25, wherein transacting on the electronic mortgage document comprises sending purchase proceeds to a lender pursuant to a purchase in a secondary mortgage market.

29. The apparatus of claim 25, wherein transacting on the electronic mortgage document comprises receiving purchase proceeds from an investor pursuant to a sale in a secondary mortgage market.

* * * * *